US008738804B2

(12) United States Patent  
Childress et al.

(10) Patent No.: US 8,738,804 B2  
(45) Date of Patent: May 27, 2014

(54) SUPPORTING TRANSACTIONS IN A DATA NETWORK USING ROUTER INFORMATION

(75) Inventors: Rhonda L. Childress, Austin, TX (US); David Bruce Kumhyr, Austin, TX (US); Neil Raymond Pennell, Cedar Creek, TX (US)

(73) Assignee: International Business Machines Corporation, Armonk, NY (US)

( * ) Notice: Subject to any disclaimer, the term of this patent is extended or adjusted under 35 U.S.C. 154(b) by 3366 days.

(21) Appl. No.: 10/753,817

(22) Filed: Jan. 8, 2004

(65) Prior Publication Data

US 2005/0154758 A1 Jul. 14, 2005

(51) Int. Cl.
*G06F 15/16* (2006.01)

(52) U.S. Cl.
USPC .......................................................... 709/245

(58) Field of Classification Search
USPC .......... 709/232–235, 238–244, 201–203, 245
See application file for complete search history.

(56) References Cited

U.S. PATENT DOCUMENTS

| | | | | |
|---|---|---|---|---|
| 5,455,952 A | 10/1995 | Gjovaag | ......................... | 395/700 |
| 5,596,703 A | 1/1997 | Eick et al. | ..................... | 395/326 |
| 5,720,018 A | 2/1998 | Muller et al. | ................. | 395/133 |
| 5,835,720 A * | 11/1998 | Nelson et al. | ................. | 709/224 |
| 5,894,479 A * | 4/1999 | Mohammed | ................... | 370/401 |
| 6,182,136 B1 | 1/2001 | Ramanathan et al. | ....... | 709/224 |
| 6,295,276 B1 * | 9/2001 | Datta et al. | ..................... | 370/218 |
| 6,425,007 B1 | 7/2002 | Messinger | | |
| 6,473,802 B2 | 10/2002 | Masters | | |
| 6,499,034 B1 | 12/2002 | Mackinlay | ..................... | 707/102 |
| 7,150,015 B2 | 12/2006 | Pace et al. | | |
| 7,418,547 B2 | 8/2008 | Lam | | |
| 7,733,806 B2 | 6/2010 | Childress et al. | | |
| 2002/0040400 A1 | 4/2002 | Masters | | |
| 2002/0103631 A1 * | 8/2002 | Feldmann et al. | .............. | 703/22 |
| 2002/0105911 A1 | 8/2002 | Pruthi et al. | | |
| 2002/0194324 A1 * | 12/2002 | Guha | ............................ | 709/223 |
| 2003/0005092 A1 * | 1/2003 | Nelson et al. | ................. | 709/220 |

(Continued)

FOREIGN PATENT DOCUMENTS

| | | |
|---|---|---|
| EP | 0918412 A2 | 5/1999 |
| JP | 06062013 | 3/1994 |

(Continued)

OTHER PUBLICATIONS

Plummer, "An Ethernet Address Resolution Protocol—or—Converting Network Protocol Addresses to 48.bit Ethernet Address for Transmission on Ethernet Hardware", Network Working Group, Nov. 1982, 10 pages.

(Continued)

*Primary Examiner* — Maceeh Anwari
(74) *Attorney, Agent, or Firm* — Yee & Associates, P.C.; Jeffrey S. LaBaw

(57) ABSTRACT

A method, apparatus, and computer instructions for monitoring transactions for a set of known nodes in a network data processing system. Cache data is received from a router in the data processing system. The cache data includes an identification of the set of known nodes sending data packets for transactions onto the network data processing system. The transactions are tracked for the set of nodes using the cache data from the router. In this manner, the loading of work for different nodes in a set of nodes can be identified.

3 Claims, 3 Drawing Sheets

(56) References Cited

U.S. PATENT DOCUMENTS

| | | |
|---|---|---|
| 2003/0033402 A1 | 2/2003 | Battat et al. ............... 709/224 |
| 2003/0074473 A1 | 4/2003 | Pham et al. |
| 2004/0221296 A1* | 11/2004 | Ogielski et al. ............ 719/313 |
| 2005/0154776 A1 | 7/2005 | Childress et al. |
| 2007/0113017 A1 | 5/2007 | Lam |

FOREIGN PATENT DOCUMENTS

| | | |
|---|---|---|
| JP | 10303961 | 11/1998 |
| JP | 2001075687 | 3/2001 |
| JP | 2002281059 | 9/2002 |
| JP | 2002281059 A | 9/2002 |
| WO | WO 00/05594 | 2/2000 |

OTHER PUBLICATIONS

Application No. AUS920031002US1, Childress et al., Method and Apparatus for Non-Invasive Discovery of Relationships Between Nodes in a Network.

Notice of allowance dated Jun. 25, 2013 regarding U.S. Appl. No. 10/753,858, 16 pages.

* cited by examiner

SUPPORTING TRANSACTIONS IN A DATA NETWORK USING ROUTER INFORMATION

CROSS REFERENCE TO RELATED APPLICATION

The present invention is related to an application entitled Method and Apparatus For Non-Invasive Discovery of Relationships Between Nodes in a Network, Ser. No. 10/753,858, filed even date hereof, assigned to the same assignee, and incorporated herein by reference.

BACKGROUND OF THE INVENTION

1. Technical Field

The present invention relates generally to an improved data processing system and in particular to a method and apparatus for identifying node usage in a set of nodes. Still more particularly, the present invention relates to a method, apparatus, and computer instructions for identifying transactions handled by nodes.

2. Description of Related Art

A network data processing system is a system that transmits any combination of voice, video, and/or data between different clients. The network for this system includes a medium used to provide communications links between various devices and computers connected within the network data processing system. These devices include permanent connections, such as wire or fiber optic cables, or temporary connections, such as those made through telephone connections. Devices in addition to server and client machines include bridges, routers, and switches. Additionally, a network data processing system also may include wireless connections with supporting hardware, such as antennas and towers.

A number of different types of networks are present, such as a wide area network (WAN) and a local area network (LAN). A LAN is a communications network that serves users within some confined geographic area. Typically, a LAN uses clients and servers that have network-enabled operating systems. A WAN is a communications network covering a wide geographic area, such as a state or country. LANs are typically limited to a building or complex. Another example of a network is the Internet. The Internet, also referred to as an "internetwork", is a set of computer networks, possibly dissimilar, joined by means of gateways that handle data transfer and the conversion of messages from a protocol of the sending network to a protocol of the receiving network. When capitalized, the term "Internet" refers to the collection of networks and gateways that use the TCP/IP suite of protocols.

Businesses and other organizations employ network data processing systems to conduct business and other transactions. These networks may be as small as a single LAN or may encompass many networks, including the Internet.

Enterprise networking involves using a network infrastructure in a large enterprise or business organization with multiple computer systems and networks. These types of infrastructures are typically extraordinarily complex. An enormous amount of effort goes into planning and managing the integration of different disparate networks and systems. Also, planning for additional interfaces as needs and demands change also occurs.

In managing an enterprise system, these systems often include a number of servers that are assigned to provide different services. Management of these servers is an important function of ensuring that services are provided when needed. Managing the allocation of resources for providing services to process requests is an important and complex task.

As part of a process to identify the capability and usage of resources, identifying transactions processed by nodes, such as servers, is important for use in ensuring that a perceived capability matches the actual usage for those nodes.

For example, a set of servers may be provisioned to handle requests for a Website set up to support an online business that provides goods or services. The servers also may be set up to provide access to data, such as medical records, tax information, or regulations. The resources needed vary depending on the usage and demand from clients. In provisioning resources, it is important to identify the usage of the resources. If the usage increases, capacity may be added to meet the increasing demand. In some cases, the addition of servers may be unnecessary because one or more current servers may be underutilized while others may be strained to the point of failure or are unable to meet expected service levels. A mismatch in the capabilities is often identified by the occurrence of a failure and subsequent analysis of the system. These failures typically occur when currently used load balancing techniques are unable to adequately monitor and maintaining the capabilities for servicing requests.

When an application is simple and does not require the state to persist over multiple requests from a user, the normal round robin or other such load balancing techniques are sufficient to maintain capabilities for servicing requests. In the case where the application is more complex and requires state information to persist across multiple requests, the presently available load balancing techniques are unable to sufficiently monitor and manage resources for servicing requests. In the case where state information is persisted, the user's session is required to be associated with a particular server providing the information. This situation is generally referred to as "sticky load balancing". In this case it is normal for a single server to become overloaded due to the stickiness of the transaction. This problem increases when the situation changes from the user being a human using a browser to a computer using Web services. The main reason for having to maintain state information in these examples is the need to access legacy systems.

Therefore, it would be advantageous to have an improved method, apparatus, and computer instructions for identifying transactions being handled by a set of nodes in a network data processing system.

SUMMARY OF THE INVENTION

The present invention provides a method, apparatus, and computer instructions for monitoring transactions for a set of known nodes in a network data processing system. Cache data is received from a router in the data processing system. The cache data includes an identification of the set of known nodes sending data packets for transactions onto the network data processing system. The transactions are tracked for the set of nodes using the cache data from the router. In this manner, the loading of work for different nodes in a set of nodes can be identified.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
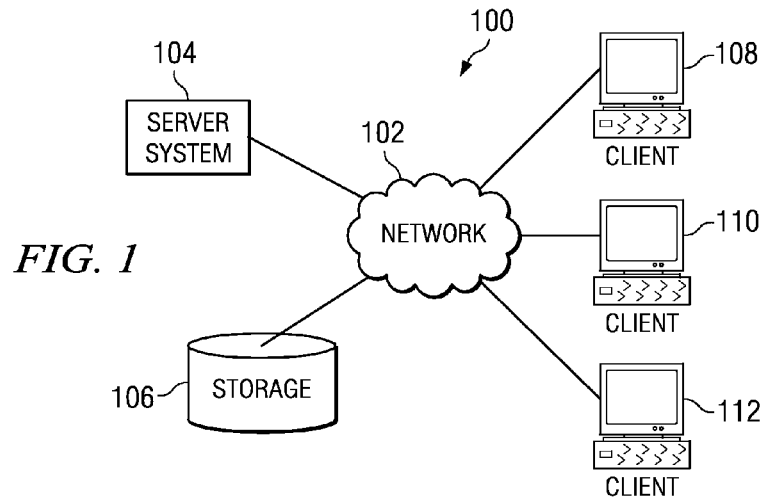
FIG. 1 depicts a pictorial representation of a distributed data processing system in which the present invention may be implemented.

With reference now to the figures, FIG. 1 depicts a pictorial representation of a distributed data processing system in which the present invention may be implemented. Distributed data processing system 100 is a network of computers in which the present invention may be implemented. Distributed data processing system 100 contains a network 102, which is the medium used to provide communication links between various devices and computers connected together within distributed data processing system 100. Network 102 may include permanent connections, such as wire or fiber optic cables, or temporary connections made through telephone connections.

In the depicted example, a server system 104 is connected to network 102 along with storage unit 106. Server system 104 typically will contain two or more servers and is also referred to as a "cluster." In addition, clients 108, 110, and 112 also are connected to a network 102. These clients 108, 110, and 112 may be, for example, personal computers or network computers. For purposes of this application, a network computer is any computer, coupled to a network, which receives a program or other application from another computer coupled to the network. In the depicted example, server system 104 provides data, such as boot files, operating system images, and applications to clients 108-112. Clients 108, 110, and 112 are clients to server 104. Distributed data processing system 100 may include additional servers, clients, and other devices not shown. In the depicted example, distributed data processing system 100 is the Internet with network 102 representing a worldwide collection of networks and gateways that use the TCP/IP suite of protocols to communicate with one another. At the heart of the Internet is a backbone of high-speed data communication lines between major nodes or host computers, consisting of thousands of commercial, government, educational, and other computer systems that route data and messages. Of course, distributed data processing system 100 also may be implemented as a number of different types of networks, such as for example, an intranet, a local area network (LAN), or a wide area network (WAN). FIG. 1 is intended as an example and not as an architectural limitation for the present invention.

Figure 2:
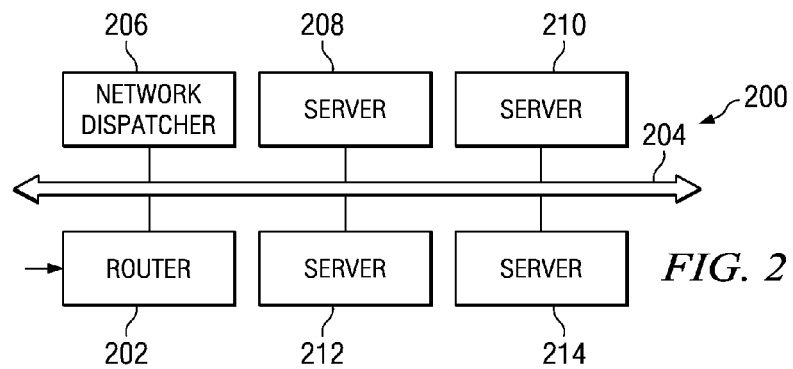
FIG. 2 is a server system depicted in accordance with a preferred embodiment of the present invention.

Turning now to FIG. 2, a server system is depicted in accordance with a preferred embodiment of the present invention. Server system 200 may be implemented as server system 104 in FIG. 1.

Server system 200 in this example includes router 202, which receives requests from clients. Router 202 is connected to bus 204. This bus also provides an interconnection for network dispatcher 206. Network dispatcher 206 is also referred to as a "front-end processor". Also within server system 200 are servers 208, 210, 212, and 214. These servers are identical servers in these examples. Identical servers are servers that process requests at the same rate.

Network dispatcher 206 will receive requests from router 202 and send the requests to a server within server system 200 for processing. Responses to the requests are routed from the server processing the request back to the client through router 202 in these examples.

In accordance with a preferred embodiment of the present invention, a client making a request to a server and server system 200 only sees a single server. Servers 208, 210, 212, and 214 share data received within server system 200, as well as the network address. For example, a request to server system 200 is made to a particular network address, such as an Internet Protocol (IP) address. Router 202 will receive the request and route this request to network dispatcher 206. In turn, network dispatcher 206 will send the request to the appropriate server for processing. This routing of the request to an appropriate server for processing is transparent and is not visible to a client making a request.

The illustration of server system 200 in FIG. 2 is not meant to imply architectural limitations to the present invention. For example, only four servers are illustrated in the system. Other numbers of servers may be used to implement a server system. Additionally, bus 204 may take various forms. Bus 204 also may take the form of a local area network or some other shared resource mechanism to transfer data within server system 200.

Figure 3:
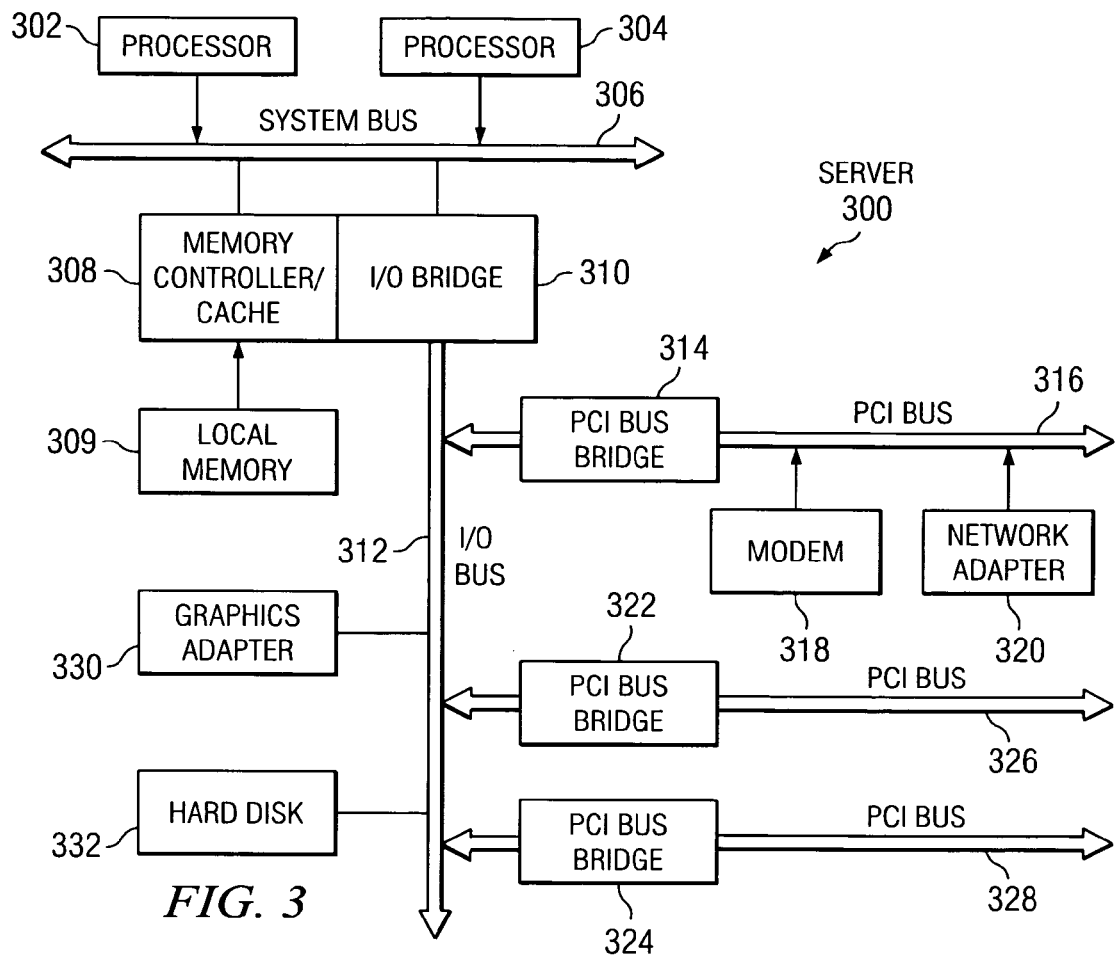
FIG. 3 is a block diagram depicting a data processing system that may be implemented as a server or network dispatcher in accordance with a preferred embodiment of the present invention.

Referring to FIG. 3, a block diagram depicting a data processing system that may be implemented as a server or network dispatcher is depicted in accordance with a preferred embodiment of the present invention. Data processing system 300 may be implemented as a server, such as servers 208, 210, 212, or 214 in FIG. 2. Further, a network dispatcher, such as network dispatcher 206 in FIG. 2, may be implemented using data processing system 300.

Data processing system 300 may be a symmetric multiprocessor (SMP) system including a plurality of processors 302 and 304 connected to system bus 306. Alternatively, a single processor system may be employed. Also connected to system bus 306 is memory controller/cache 308, which provides an interface to local memory 309. I/O bus bridge 310 is connected to system bus 306 and provides an interface to I/O bus 312. Memory controller/cache 308 and I/O bus bridge 310 may be integrated as depicted.

Peripheral component interconnect (PCI) bus bridge 314 connected to I/O bus 312 provides an interface to PCI local bus 316. A number of modems may be connected to PCI bus 316. Typical PCI bus implementations will support four PCI expansion slots or add-in connectors. Communications links to network computers 108-112 in FIG. 1 may be provided through modem 318 and network adapter 320 connected to PCI local bus 316 through add-in boards.

Additional PCI bus bridges 322 and 324 provide interfaces for additional PCI buses 326 and 328, from which additional modems or network adapters may be supported. In this manner, data processing system 300 allows connections to multiple network computers. A memory-mapped graphics adapter 330 and hard disk 332 may also be connected to I/O bus 312 as depicted, either directly or indirectly.

Those of ordinary skill in the art will appreciate that the hardware depicted in FIG. 3 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 3 may be, for example, an IBM RISC/System 6000 system, a product of International Business Machines Corporation in Armonk, N.Y., running the Advanced Interactive Executive (AIX) operating system.

The present invention provides a method, apparatus, and computer instructions for monitoring transactions for a set of known nodes in a network data processing system. The mechanism of the present invention uses cache data from one or more routers in the network data processing system. This cache data includes an identification of the nodes sending packets for transactions onto the network data processing system. As used herein, a transaction begins when a user input at a client generates a request that is sent to a server and ends when a response is received by the client at which the user is located.

Based on transactions being handled by the different nodes, the loading on the nodes may be identified. In this manner, the mechanism of the present invention allows identifying whether all of the nodes are being evenly utilized. Consequently, analysis of transaction may be made with respect to usage. With this analysis, capability and changes in provisioning or assignment of servers may occur based on the analysis.

Figure 4:
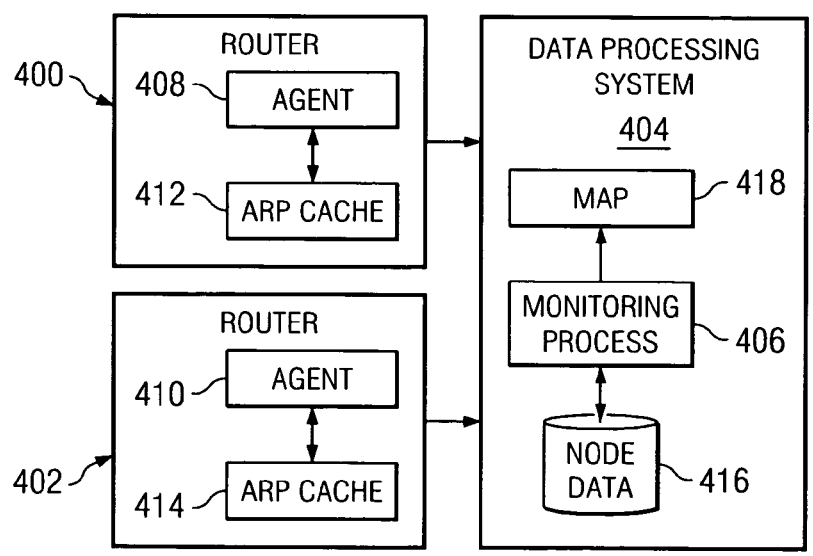
FIG. 4 is a diagram illustrating components used in discovering nodes and relationships between nodes in a network data processing system.

With reference now to FIG. 4, a diagram illustrating components used in discovering nodes and relationships between nodes in a network data processing system is depicted. In this illustrative example, router 400 and router 402 are present in a network data processing system, such as network data processing system 100 in FIG. 1. In particular, these devices may be located as part of network 102. Data processing system 404 is used to obtain data from data caches in router 400 and router 402 in these illustrative examples.

In particular, monitoring process 406 in data processing system 404 obtains data from agent 408 and agent 410, which are located in router 400 and router 402, respectively. These agents are processes or daemons that are used to obtain a snapshot of data in ARP cache 412 and ARP cache 414, respectively.

When agent 408 obtains data from ARP cache 412, the data is cleared from ARP cache 412. This data is sent to monitoring process 406, which stores the snapshot of ARP cache 412 in node data 416. Similarly, agent 410 obtains a snapshot of data in ARP cache 414 and sends that information to monitoring process 406 for storage in node data 416. Thereafter the data is cleared from ARP cache 414.

ARP cache 412 and ARP cache 414 contain data, identifying nodes that have sent packets that have been routed through router 400 or router 402. By obtaining this information from these data caches in router 400 and router 402, nodes that have transmitted packets may be identified, even though these nodes may not respond to direct requests for responses. In this manner, the identification of nodes on a network data processing system is made in a non-invasive manner.

Using node data 416, monitoring process 406 generates map 418. This map is used to present a graphical view of nodes in the network data processing system. Further, this map includes an identification of communication paths between the different nodes as well as an identification of network traffic.

Figure 5:
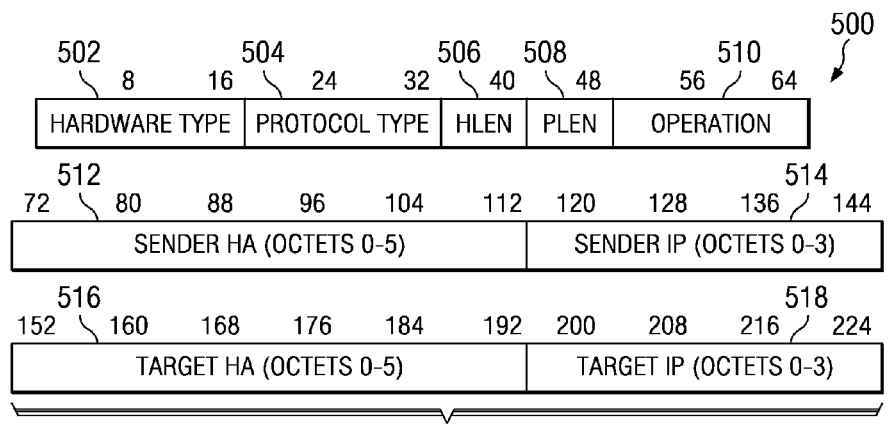
FIG. 5 is a diagram illustrating information stored for entry in the data cache for a router in accordance with a preferred embodiment of the present invention.

Turning now to FIG. 5, a diagram illustrating information stored for entry in the data cache for a router is depicted in accordance with a preferred embodiment of the present invention. Entry 500 is an example of data that is stored in an ARP entry in these examples. Each of these entries is made in response to the routing of a packet through a router from a node.

Entry 500 includes hardware type 502, protocol type 504, HLEN 506, PLEN 508, operation 510, sender hardware address (HA) 512, sender IP 514, target hardware address (HA) 516, and target IP 518.

Hardware type 502 is the type of adapter, such as an Ethernet adapter, that is being used. Protocol type 504 is the type of protocol being used to transmit messages. In these examples, the protocol type is IP. HLEN 506 is the length in bytes of the hardware address, while PLEN 508 is the length in bytes of the protocol address. Operation 510 indicates the type of operation being performed, such as a request or a reply.

In these examples, sender hardware address 512 is a media access control (MAC) address, which is included in a packet from a node transmitting the packet. A MAC address is a unique serial number that is associated with an adapter to identify that adapter from all others on a network. Sender IP 514 is the IP address of the node, which is also referred to as the source address. The target hardware address is the MAC address for an adapter in the target node. The target IP is the IP address of the destination node, which is also referred to as the destination address for the packet.

Figure 6:
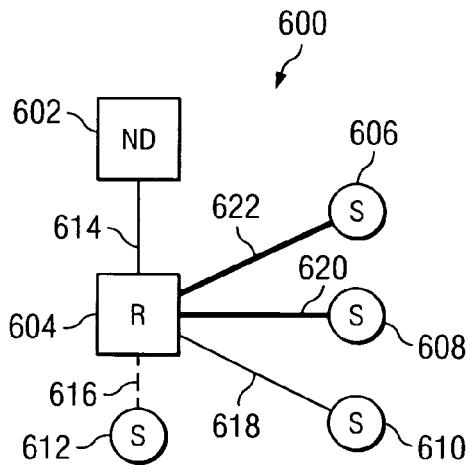
FIG. 6 is a diagram illustrating usage of nodes in accordance with a preferred embodiment of the present invention.

Turning now to FIG. 6, a diagram illustrating usage of nodes is depicted in accordance with a preferred embodiment of the present invention. Diagram 600 shows network dispatcher 602 and router 604. Router 604 may be, for example, router 400 in FIG. 4. Additionally, servers 606, 608, 610, and 612 are shown in diagram 600. Connections 614, 616, 618, 620, and 622 are shown for the different nodes in diagram 600.

In this figure, connections 616, 618, 620, and 622 illustrate the relative traffic between nodes for the servers of interest. In these illustrative examples, server 606, 608, 610 and 612 correspond to servers 208, 210, 212, and 214 in FIG. 2. The transactions handled by servers 606 and 608 are greater than those handled by servers 610 and 612. In this illustrative example, connection 616 is illustrated with a dotted line to indicate that no traffic is present with respect to server 612. This inference regarding traffic is made by the absence of any data in the data cache for router 604.

The absence of data in the cache indicates that transactions are not being handled by server 612. As a result, an analysis or inspection of server 612 may be made to identify why transactions are not being handled by this particular server. Such a feature also may be used to initiate a load balancing process depending on the particular implementation. In this manner, traffic may be routed to server 612 with less traffic being routed to server 606 and 608 to balance the load handled by the different servers. This type of monitoring allows for the identification of the distribution of loads between machines in a non-intrusive manner. Often times, the monitoring of a given server is turned off during time of heavy load to provide additional CPU cycles to process transactions. This situation may occur with server systems, such as those for trading houses or banks in which time and money critical transactions occur.

The manner in which nodes and connections are illustrated in FIG. 6 is not known to limit the way in which the information may be presented. For example, different colors and animations may be used in place of or in addition to the thickness of the segments for these connections.

Figure 7:
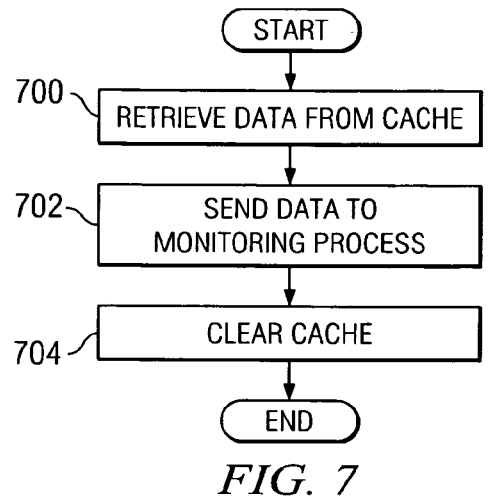
FIG. 7 is a flowchart for a process for obtaining a snapshot of data from a cache in accordance with a preferred embodiment of the present invention.

Turning now to FIG. 7, a flowchart for a process for obtaining a snapshot of data from a cache is depicted in accordance with a preferred embodiment of the present invention. The process illustrated in FIG. 7 may be implemented in an agent, such as agent 408 in FIG. 4 to obtain data from a data cache, such as ARP cache 412 in FIG. 4.

The process begins by retrieving data from the cache (step 700). Thereafter, the data is sent to a monitoring process (step 702). In the illustrative examples, the monitoring process is one such as monitoring process 406 in FIG. 4. Thereafter, the data cache is cleared (step 704) with the process terminating thereafter.

This process may be initiated on some periodic basis based on a timer executed by an agent process. Further, this process may be initiated through a request generated by the monitoring process in response to an event. This event may be periodic or non-periodic depending on the particular implementation. The event may be based on the expiration of the timer or based on some request generated by a network administrator in the illustrative examples.

Figure 8:
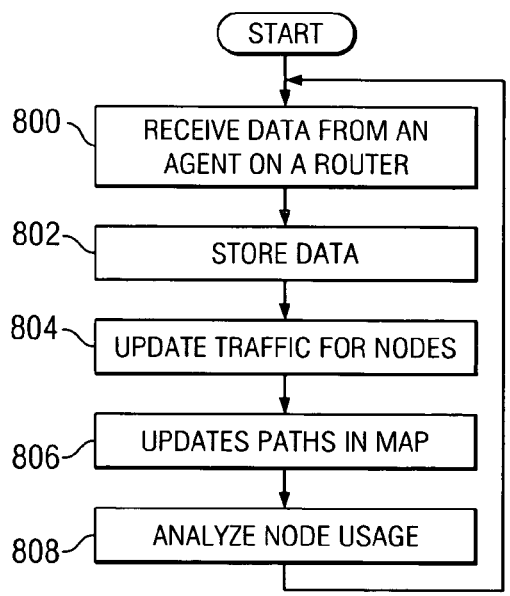
FIG. 8 is a flowchart of a process for identifying transactions handled by nodes in a network data processing system in accordance with a preferred embodiment of the present invention.

With reference next to FIG. 8, a flowchart of a process for identifying transactions handled by nodes in a network data processing system is depicted in accordance with a preferred embodiment of the present invention. The process illustrated in FIG. 8 may be implemented in a monitoring process, such as monitoring processing 404 in FIG. 4.

The process begins by receiving data from an agent on a router (step 800). Thereafter, the data is stored (step 802). This data is stored in a data structure, such as node data 414. Traffic for the nodes is updated (step 804).

Thereafter, the paths in the map are updated (step 806). This updating is used to indicate the amount of traffic for transactions being handled by the different nodes being monitored. Next, node usage is analyzed (step 808). Thereafter, the process returns to step 800.

This analysis in step 808 may be made through various statistical processes or algorithms to determine the usage of nodes within the set of nodes. This process may identify nodes that are being under-utilized or over-utilized with respect to the particular functions being performed.

In an environment where a sticky load balancer is used, the session must maintain its association with the server it started with to disperse initial traffic across a pool of servers. In one illustrative example, the pool contains three servers. As the load increases on the servers in the pool, more servers are added to the pool. Because the sessions are long running, the work is not distributed to the new servers in the pool. In this instance, the new servers may be under utilized. In this case, it is better to reclaim these servers and use them elsewhere. A similar case exists if the pool has five servers and only three of the servers are being used to support long running sessions. The mechanism of the present invention may be used to identify the two servers that are not performing any work.

These situations in the illustrative examples exist because these systems were architected and created before the best practices came about and rewrites for these environments are at a fundamental level that would require close to a ninety percent replacement of code. This problem also occurs when an integration of systems occurs during a merger of businesses.

Figure 9:
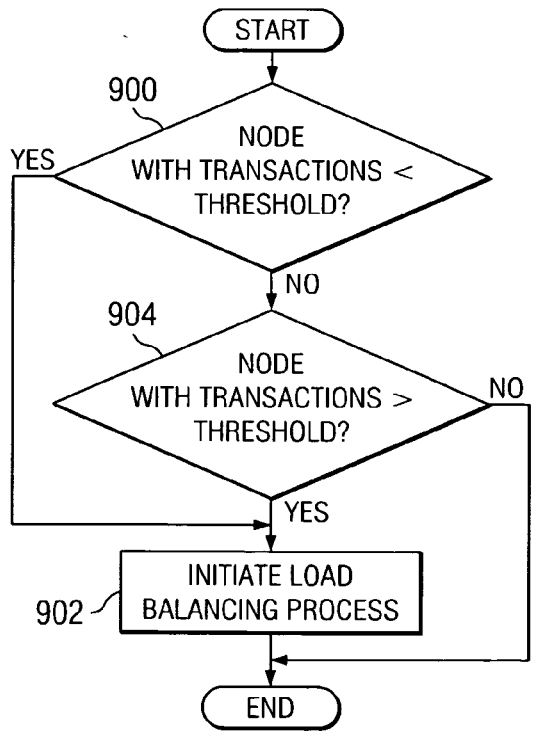
FIG. 9 is a flowchart of a process for initializing a load balancing process in accordance with a preferred embodiment of the present invention.

With reference now to FIG. 9, a flowchart of a process for initializing a load balancing process is depicted in accordance with a preferred embodiment of the present invention. The process illustrated in FIG. 9 may be implemented in a monitoring process, such as monitoring process 404 in FIG. 4.

The process begins by determining whether a node is present with transactions less than a selected threshold. If a node is present with transactions less than some selected threshold, then a load balancing process is initiated (step 902) with the process terminating thereafter.

With reference again to step 900, if a node is not present with transactions that is less than a selected threshold, then a determination is made as to whether a node is present with transactions that are greater than a threshold (step 904). The threshold in step 900 and the threshold in step 904 are different values in the illustrative embodiment. The exact values for these thresholds depends on the particular implementation.

If a node is present with transactions greater than a threshold, the process proceeds (step 902) as previously described. Otherwise, the process terminates.

Thus, the present invention provides an improved method, apparatus, and computer instructions for identifying transactions and managing the capability to support transactions. The mechanism of the present invention utilizes data found in the cache of a router to determine the transactions being handled by the different nodes. In these examples, the presence of the nodes are known, and an absence of data for a particular node indicates that the node is not handling transactions.

Further, this data may be used to generate a map or display to graphically present the different nodes and the transactions being handled by the nodes. In this manner, adjustments may be made to load balancing, assignment or allocation of servers to ensure that a match between the capability and demand for services is met.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a data processing system for monitoring transactions for a set of known nodes in a network data processing system, the method comprising:
    receiving cache data from a router in the data processing system, wherein the cache data includes an identification of the set of known nodes sending data packets for transactions onto the network data processing system, wherein the receiving step occurs on a periodic basis;
    identifying the transactions handled by each node in the set of known nodes using the identification of the set of nodes included in the cache data received from the router, to form identified transactions;
    analyzing the identified transactions;
    in response to the analyzing the identified transactions, selectively initiating a load balancing process for at least one of the nodes in the set of known nodes to mitigate transaction overload at the at least one of the nodes; and
    generating a display of the set of known nodes in a graphical view, wherein the graphical view includes the communications paths with a graphical indication of the network traffic.

2. A data processing system, including a system bus, for monitoring transactions for a set of known nodes in a network data processing system, the data processing system comprising:
    a data processor coupled to the system bus and a memory comprising instructions that are executable to perform steps of:
    receiving cache data from a router in the data processing system, wherein the cache data includes an identification of the set of known nodes sending data packets for transactions onto the network data processing system, wherein the receiving means is initiated on a periodic basis;
    identifying the transactions handled by each node in the set of known nodes using the identification of the set of nodes included in the cache data received from the router, to form identified transactions;
    analyzing the identified transactions;
    selectively initiating, responsive to analyzing the identified transactions, a load balancing process for at least one of the nodes in the set of known nodes to mitigate transaction overload at the at least one of the nodes; and
    generating a display of the set of known nodes in a graphical view, wherein the graphical view includes the communications paths with a graphical indication of the network traffic.

3. A method in a data processing system for monitoring transactions for a set of known nodes in a network data processing system, the method comprising:
    receiving cache data from a router in the data processing system, wherein the cache data includes an identification of the set of known nodes sending data packets for transactions onto the network data processing system;
    identifying the transactions handled by each node in the set of known nodes using the identification of the set of nodes included in the cache data received from the router, to form identified transactions;
    analyzing the identified transactions; and
    in response to the analyzing the identified transactions, selectively initiating a load balancing process for at least one of the nodes in the set of known nodes to mitigate transaction overload at the at least one of the nodes, wherein the cache data is from an address resolution protocol cache located on the router and is received through an agent located on the router, where the agent clears the address resolution protocol cache each time the cache data is sent to the data processing system.

* * * * *